United States Patent [19]

Liang et al.

[11] Patent Number: 5,145,820

[45] Date of Patent: Sep. 8, 1992

[54] REDUCED PRESSURE SUBLIMATION OF AMINE COMPOUNDS ON ACTIVATED CARBONS

[75] Inventors: Septimus H. Liang; Brian H. Harrison, both of Ottawa; Jack G. Pagotto, Nepean, all of Canada

[73] Assignee: Her Majesty the Queen in right of Canada, as represented by Minister of National Defence of Her Majesty's Canadian Government, Ontario, Canada

[21] Appl. No.: 691,323

[22] Filed: Apr. 26, 1991

[30] Foreign Application Priority Data

May 1, 1990 [CA] Canada ............................ 2015810

[51] Int. Cl.$^5$ ................. B01J 20/22; B01D 53/04
[52] U.S. Cl. ........................ 502/401; 55/71; 55/74; 423/236; 423/240.5
[58] Field of Search ............................. 502/401

[56] References Cited

U.S. PATENT DOCUMENTS

| | | | |
|---|---|---|---|
| 4,531,953 | 7/1985 | Groose | 502/401 |
| 4,801,311 | 1/1989 | Tolles | 55/71 |
| 4,802,898 | 2/1989 | Tolles | 55/71 |

FOREIGN PATENT DOCUMENTS

| | | | |
|---|---|---|---|
| 1544586 | 9/1968 | France . | |
| 0143027 | 10/1984 | France . | |
| WO81/02256 | 8/1981 | PCT Int'l Appl. | 55/71 |
| 1123822 | 8/1968 | United Kingdom | 502/401 |

Primary Examiner—Paul E. Konopka
Attorney, Agent, or Firm—Nixon & Vanderhye

[57] ABSTRACT

Activated carbon is used on gas-mask canisters for filtering air to remove toxic vapors. For military use, the charcoal is impregnated with inorganic salts or organic compounds for improving the chemical activity of the charcoal with respect to toxic vapors having low boiling points and small molecular sizes, e.g. cyanogen chloride. One such compound, namely triethylenediamine (TEDA) has been added to charcoal by sublimation at atmospheric pressure. A more effective method of impregnating charcoal with TEDA utilizes reduced pressure 0.13 to 13 Pa, preferably 1.3 Pa as a driving force to facilitate vaporization of the TEDA by sublimation. The activated carbon to be impregnated is dried at 110° C. to 160° C. for three hours and transferred to a vacuum desiccator. The required amount of the amine, namely 1.57 to 12.57%, preferably 4.7% is placed in the container on top of the activated carbon and the container is evacuated to a pressure of about 1.3 Pa and heated at 40° C. for two to three days until the amine compound is no longer visible on the carbon. The resulting TEDA impregnated carbon provides improved protection against toxic gases compared to the precursor charcoal.

5 Claims, 5 Drawing Sheets

REDUCED PRESSURE SUBLIMATION OF AMINE COMPOUNDS ON ACTIVATED CARBONS

This invention relates to a process for impregnating activated carbon with an organic compound, and in particular to a process for impregnating activated carbon with triethylenediamine.

Activated carbon is an adsorbent material commonly used in respirators for the removal of toxic vapours from inhaled air. The choice of activated carbon is based on known advantages, including (i) activated carbon has a large surface area and micropore volume and thus a high adsorptive capacity for most organic compounds, (ii) carbon is a non-selective adsorbent, (iii) activated carbon has a relatively low cost compared to other commercially available adsorbents such as zeolites and (iv) a carbon bed of the correct mesh size offers acceptable pressure drop and breathing resistance to the user compared to other adsorbents with similar surface area to weight ratios. However, the use of activated carbon (commonly referred to as charcoal), specially in military gas mask canisters is not without some disadvantages. Some of the deficiencies such as the effect of aging, the decrease in dynamic adsorptive capacity at high relative humidity and the inherent low adsorptive capacity for low-boiling chemicals have been documented. Impregnation of the activated carbon with inorganic salts such as copper, chromium and silver salts (the whetlerization procedure) greatly reduces the deficiency of the charcoal in the removal of volatile gases and liquids. The purpose of the inorganic salts on the charcoal surface is to chemically or catalytically react with the low boiling toxic vapours such as hydrogen cyanide (AC), phosgene (CG) and cyanogen chloride (CK) and convert such vapours into non-toxic deposits or innocuous gases, thus rendering the contaminated air breathable.

At the desired concentration of 6 to 8% copper, 2 to 3% chromium (hexavalent chromium) and 0 to 0.5% silver, the charcoal is optimised for protection against low boiling toxic vapours such as those listed above. Charcoal treated in this manner is called ASC-whetlerite charcoal. However, the process of whetlerization decreases the internal pore area of the charcoal by as much as 22%, thus decreasing the original capacity of the charcoal for the physisorption of other toxic vapours such as chloropicrin (PS), mustards and nerve agents.

Secondary impregnation of the ASC whetlerite with organic compounds such as tartaric acid and organic amines such as pyridine and hexamine have also been attempted. In general, it has been found that the charcoal retains the original properties with an added resistance to aging, i.e. a longer shelf life. Compounds such as pyridine actually enhance the service life of charcoal against volatile organic compounds such as cyanogen chloride and phosgene. Recently, the impregnation of triethylenediamine on charcoal has attracted the attention of Canadian, American and British researchers. In the nuclear industry, the impregnation of charcoal adsorbents with triethylenediamine led to an improved adsorbent with excellent performance in the monitoring and trapping of radioactive iodine and methyl iodide from the off-gases of nuclear reactors The same technology has been extended to the treatment of military charcoal used in respirators for improved protection against small, volatile compounds such as cyanogen chloride which normally do not adsorb on the charcoal surface to any significant extent. There are several ways to apply TEDA to the surface of the charcoal. One such method involving the spraying of an aqueous solution of TEDA onto the charcoal is deemed to be inferior because:

(i) the desired concentration of TEDA to be impregnated onto the charcoal is difficult to monitor;

(ii) a homogeneous layer of TEDA on the charcoal is difficult to maintain;

(iii) since an aqueous solution is used, water has to be driven off by drying. It has been shown that the temperature at which this charcoal is dried is critical in order to avoid self-ignition, and the possible desorption of TEDA; and (iv) the application of the aqueous solution (of TEDA) may leach out some of the inorganic impregnants put on earlier.

A more recent proposal for applying TEDA to the surface of charcoal is found in U.S. Pat. No. 4,531,953, which issued to J. E. Groose et al on Jul. 30, 1985. The Groose et al patent proposes the direct sublimation of TEDA onto the charcoal surface at atmospheric pressure. Such a process eliminates the subsequent drying procedure because no solvent is involved. While the Groose et al method produces the desired result, a need still exists for a more effective method of impregnating charcoal with TEDA.

The object of the present invention is to meet the above defined need by providing a relatively simple, effective method of impregnating charcoal with an organic amine compound, and in particular with triethylenediamine.

Accordingly, the present invention relates to a process for impregnating activated carbon with an organic amine comprising the steps of placing the amine on dried activated carbon; subjecting the activated carbon and the amine to a vacuum; and then heating the carbon and the amine for an extended period while under vacuum.

The use of the method described above facilitates the vaporization of triethylenediamine, the penetration of the amine molecules into the micropores on the charcoal surface, and subsequently the adsorption of the TEDA molecules onto the charcoal surface. The lengthy heating in a closed container allows a "surface distillation" of the amine (by adsorption-desorption processes), thus promoting an even distribution of amine molecules on the charcoal surface.

The three basic steps of the method include initial drying and degassing; impregnation with triethylenediamine at reduced pressure and equilibration.

The initial drying was deemed necessary after testing the present impregnation method using two types of charcoal. The first type was freshly prepared impregnated charcoal. Since ASC charcoal must be dried after whetlerization, the drying procedure can be incorporated into the last step of the impregnation procedure. The other type of carbon was aged charcoal containing various levels of moisture content. For impregnation of TEDA at atmospheric pressure, the amine molecules have to displace adsorbed water from the charcoal surface, thus increasing the activation energy requirement (compared to a charcoal surface without adsorbed water). If the micropores on the charcoal surface are completely or partially filled with water, the adsorption of TEDA will also depend on how quickly adsorbed water can be displaced which is a kinetic problem.

Therefore, the charcoal must be dry before the introduction of the amine.

The second step in the method, namely impregnation of the amine on the charcoal which includes the following series of processes:
(i) sublimation of TEDA:
(ii) external diffusion of TEDA molecules to the charcoal surface;
(iii) internal diffusion of TEDA molecules inside the charcoal pores; and
(iv) adsorption of TEDA molecules.

In order to understand why reduced pressure facilitates the impregnation of the amine on charcoal, it is important to establish which of the above listed processes is rate determining and its dependence on pressure. This is obvious, because if the slowest rate determining step in the series is pressure independent, then it is of no consequence whether reduced pressure is used. The several mechanisms by which internal diffusion of TEDA inside the charcoal pores can occur, all of which have different pressure dependence, are discussed in detail below.

The overall rate of impregnation is determined by the slowest of the above listed processes. When reduced pressure is used, the effect of step two in terms of rate determination is expected to be negligible. The rate of adsorption is usually the quickest of the four and does not govern the overall rate. Moreover, the rate of adsorption is not pressure dependent, and at reduced pressure the overall rate will not be affected. Therefore, step (iv) can be ignored in the overall rate of impregnation which leaves the rate of sublimation or the rate of internal diffusion as the rate determining step. There are three major considerations if internal diffusion is the rate limiting step, including Fick's law, Knudsen's law and hydrodynamic flow.

Fick's law is expressed by the equation:

$$N_A = D_A \cdot \frac{\partial c}{\partial s} \quad \frac{\text{g} - \text{moles}}{(\text{cm}^2)(\text{sec})} \quad (1)$$

The law states that the net rate of diffusion, $N_A$ of material A in a stationary fluid is proportional to the concentration gradient at that point, c being the concentration (g-mole/cm$^3$), s the distance (cm) and $D_A$ the diffusivity (cm$^2$/sec). Several integrated forms of equation (1) exist for various situations. For diffusion through a flat slab of thickness z it may be written as follows:

$$N_A = \frac{D_A (C_{A1} - C_{A2})}{z} \quad (2)$$

in which $C_{A1}$ and $C_{A2}$ are the concentrations at opposite sides of the slab. For other solid shapes, the rate is given by the equation:

$$W = N_A S_{av} = \frac{D_A S_{av} (C_{A1} - C_{A2})}{z} \quad (3)$$

Appropriate values of the average cross section for diffusion $S_{AV}$ must be applied. However, it should be noted that the diffusion does not lead to conditions of constant concentration gradient unless a steady state is established. Therefore, it is often necessary to consider the change of concentration, c, with time, t, caused by diffusion as represented by a second order differential equation:

$$\frac{\partial c}{\partial t} = D_A \cdot \frac{\partial^2 c}{\partial s^2} \quad (4)$$

Solutions of this equation for a diversity of physical situations have been obtained (C. J. Crank, Mathematics of Diffusion, 2nd Ed. Oxford University Press [1975]).

For diffusion in porous solids, solute movement may be by diffusion due to concentration gradient or by hydrodynamic forces as a result of a pressure difference. For steady-state diffusion of gases, there are two types of diffusive movement, depending upon the ratio of pore diameter d to the mean free path of the gas molecule $\lambda$. If the ratio $d/\lambda$ is greater than 20, ordinary molecular diffusion will occur. In the case of $d/\lambda$ less than about 0.2, the rate of diffusion is governed by the collisions of the gas molecules with the pore walls and follows Knudsen's law.

Assuming that the pores are straight circular tubes with diameter d and length l, then the diffusion rate is given by the equation:

$$N_A = \frac{u_A d}{3RTl}(P_{A1} - P_{A2}) \quad (5)$$

where $\bar{u}_A$ is the mean molecular velocity of the diffusing gas A, and $\bar{P}_{A1} - \bar{P}_{A2}$ is the pressure difference across the solid. From the kinetic theory of gases, we obtain the equation:

$$u_A = \frac{[8 g_c RT]^{\frac{1}{2}}}{\pi M_A} \quad (6)$$

where $g_c$ is the conversion factor for gravity for gravity, $M_A$ is the molecular weight of A, R is the gas constant and T is the temperature. Therefore, $$N_A = \frac{[8 g_c RT]^{\frac{1}{2}}}{\pi M_A} \frac{d}{3RTl}(P_{A1} - P_{A2}) = \frac{D_{K,A}(P_{A1} - P_{A2})}{RTl} \quad (7)$$

where $D_{K,A}$ is the Knudsen diffusion coefficient given by:

$$D_{K,A} = \frac{d}{3} \frac{[8 g_c RT]^{\frac{1}{2}}}{\pi M_A} \quad (8)$$

Note: (i) d is not constant, (ii) the true l is unknown in equation (7), (iii) l is usually replaced by z, the solid thickness and (iv) $D_{K,A}$ is replaced by $D_{K,A,eff}$ the effective Knudsen diffusivity (which is obtained experimentally).

If a pressure drop exists across a porous solid, a hydrodynamic flow of gas through the solid will occur. Since military charcoal has a very small Reynolds number (in the range of approximately 10–100), the flow of gas in the capillaries is necessarily laminar at ordinary pressure. From Poiseuille's law for a compressible fluid obeying the ideal gas law, $$N_A = \frac{d^2 g_c}{32\mu l RT} P_{A,av}(P_{A1} - P_{A2}) \quad (9)$$

where $$P_{A,av} = \frac{P_{A1} + P_{A2}}{2} \qquad (10)$$

where μ is the viscosity of the gas. Equation (9) assumes that the entire pressure difference is the result of friction in the pores, and ignores entrance and exit losses and kinetic energy effect. Since the pores are neither straight nor of constant diameter, equation (9) is best expressed as follows:

$$N_A = \frac{k}{RTz} P_{A,av}(P_{A1} - P_{A2}) \qquad (11)$$

where k is a constant with dimension of (length)$^4$/(time)(force).

In the special situation where Knudsen flow prevails (i.e. d/λ<0.2), the flow will be described by equations (5) to (8). If the gas is a mixture of different compositions and different total pressure on either side of the porous solid, there may be a combination of hydrodynamic, Knudsen and diffusive flow.

At 40° C., the temperature set for the impregnation procedure in the present case, TEDA is estimated to have a vapour pressure of 267 to 400 Pa. The mean free path of the amine molecule can be calculated to be about 20μm based on a mean free path of 70 nm for air. Taking the average pore diameter of the micropore on the charcoal surface to be about 3 nm, the ratio d/λ is about $1\times10^{-4}$(<<0.2). Therefore Knudsen diffusion will prevail.

The Knudsen diffusion coefficient can be calculated from equation (8) to be equal to 0.00162 cm$^2$/sec. One can calculate the diffusion flux in units of mol/cm$^{-2}$-sec as $2.31\times10^{12}$. p If $N_s$ represents the sublimation flux of triethylenediamine, the rate of sublimation of TEDA from a particle of radius r can be written as:

$$\frac{N_s}{4\pi r^2} = -D_{AA}\frac{\partial C_A}{\partial r} \qquad (12)$$

wherein $D_{AA}$ represents the self-diffusion coefficient of the amine and $C_A$ represents the gas phase concentration of the amine. The above equation can be solved by integrating between two radii, where the concentrations vary from $C_{A1}$ to $C_{A2}$ to obtain the equation:

$$\frac{N_s}{4\pi}\left(\frac{1}{r_1} - \frac{1}{r_2}\right) = D_{AA}(C_{A1} - C_{A2}) \qquad (13)$$

At $r_1$ (i.e. the particle radius), the concentration is assumed to correspond to the saturation vapour pressure of TEDA at that temperature. At $r_2$ (some infinite radius in the gas phase), the partial pressure of the amine can be assumed to be negligible. Thus, the rate of sublimation is obtained by dividing equation (13) by $r_1$ to obtain the equation:

$$N_s = \frac{N_s}{4\pi r_1^2} = D_{AA}\frac{C_{A1}}{r_1} = D_{AA}\frac{P_{A1}}{RTr_1} \qquad (14)$$

where $P_{A1}$ represents the saturation vapour pressure of TEDA at temperature T.

The self-diffusion coefficient is calculated using a formula proposed by E. N. Fuller et al, Ind. Eng. Chem. 58 18 (1966). While the formula is usually applied for binary systems, it provides a fairly reasonable estimate of the self-diffusion coefficient.

The sublimation flux was calculated based on the following values of the parameters
$D_A$=0.2255 cm$^2$/s
$P_{A1}$=266.6 Pa, corresponding to the saturation vapour pressure of TEDA at 313° K.
$r_1$=0.005 cm,
R=8314 kg M$^2$ sec$^{-2}$ kg-mole$^{-1}$ °K$^{-1}$
T=313° K.

The particle radius for TEDA crystals was estimated to be approximately 0.05 mm. The saturation vapour pressure for TEDA at 313° K. was calculated by extrapolating the vapour data supplied in the references T. Wada et al Bull. Chem. Soc. Japan 33, 1317 (1960), and A. Farkas et al, J. Chem. Eng. Data. 4, 334 (1959).

Based on the above, the sublimation flux was calculated as $4.62\times10^{-6}$ mole/cm$^2$-s.

In the calculations for the Knudsen diffusion coefficient and the rate of sublimation above, it is clear that the diffusion flux is considerably lower than the sublimation flux at reduced pressure. A calculation of actual diffusion rates, assuming a particle diameter of 0.115 cm for charcoal, and 0.01 cm for the amine, leads to values for diffusion and sublimation of $9.6\times10^{-14}$ and $1.45\times10^{-9}$ mole/sec, respectively, confirming that the rate of diffusion controls the overall rate of impregnation. Since diffusion is pressure dependent and follows Knudsen's equation, at reduced pressure the diffusion is faster. Accordingly, the method proposed herein is more efficient producing TEDA impregnated charcoal than the same procedure performed at atmospheric pressure.

After impregnating the charcoal with the amine, an equilibration period is provided to allow the TEDA adsorption process to reach equilibrium. Performing the process at a slightly elevated temperature of 40° C. permits repeated distillation and redeposition of the amine to occur. Thus, a more uniform distribution of TEDA molecules on the charcoal surface is achieved. At reduced pressure, the sublimation of the amine is expedited, and thus facilitates the distillation and readsorption of TEDA on the charcoal surface.

The invention will now be described in greater detail with reference to the following example and the accompanying drawings which are simple graphs of a variety of parameters versus the loading level of triethylenediamine.

EXAMPLE 500 grams of charcoal to be impregnated with TEDA is loaded into a 2.2 liter vacuum desiccator and weighed (without the lid). The charcoal and the desiccator are placed in a forced-draft oven preheated at 150°, and the charcoal is dried for three hours. Immediately after removal from the oven, the pre-weighed lid with high vacuum silicone-based grease is placed on the desiccator. After cooling to ambient temperature, the whole container is weighed. By knowing the weight of the desiccator and assuming the weight of the grease to be negligible, the weight of dried charcoal can be estimated.

In order to obtain the desired concentration of amine-loaded charcoal, the required amount of TEDA is weighed and spread on top of the charcoal, and the lid of the desiccator is quickly replaced. The desiccator is agitated gently to allow some mixing of the charcoal with the amine crystals. The desiccator is connected to a vacuum pump (capable of a vacuum of about 1.33 Pa).

The desiccator is then evacuated for a total of 60 seconds with a duty cycle of 50% (15 seconds on—15 seconds off) and then placed in an oven at 40° C. for at least three days, i.e. until no TEDA crystals are visible to the naked eye. This period of equilibration varies for different amounts of triethylenediamine, but usually increases as the quantity of amine increases. Leaving the charcoal at 40° C. for a longer period of time may actually be beneficial, because of the resulting more uniform distribution of the amine layer on the charcoal surface.

When no amine crystals are visible the desiccator is weighed and then vented to atmosphere. It is found that a pyrex vacuum desiccator can maintain a substantial vacuum for one to two weeks at 40° C. Triethylenediamine has a very distinct odour, which is characteristic of amines. Upon removal of the lid of the desiccator, such odour cannot be detected, indicating that the amine is completed adsorbed onto the charcoal. The charcoal is removed and stored in amber rectangular polyethylene bottles with polypropylene screw caps.

The chemical triethylenediamine (TEDA) used in the foregoing example is a reagent grade material purchased from Aldrich Chemical Co. The manufacturer's label indicated that the amine had a purity of 97% and a melting point of 158° C.–160° C. On $^1$H and $^{13}$C NMR analysis, the compound (solvated in a solution of $CDCl_3$ and tetramethylsilane) was shown to have a purity level of at least 99%. The amine was used directly from the bottle without further purification.

The charcoal used was ASC-grade charcoal manufactured by Calgon Carbon Corporation, Pittsburgh, PA. The charcoal had been stored for more than five years, and had a CK life of 24±8 minutes (16 measurements which ranged from 15 to 37 minutes) when measured using a C2 filter and standard test conditions. This CK gas life would be considered substandard according to the Canadian Department of National Defence specification for gas masks used for individual protection. The charcoal was chosen so that any enhancement of 9as life by the presence of TEDA could be readily observed and quantified.

As a control, BPL-grade charcoal (totally unimpregnated), also obtained from Calgon Carbon Corporation, was employed. This was done to confirm (a) that added TEDA enhances the CK gas-life of charcoal, whether impregnated or not, and (b) the possibility that the relationship between the enhanced CK gas life and the amount of TEDA added is linear or otherwise.

All of the quality assurance tests required for ASC-charcoal were performed. The ASC-charcoal obtained from Calgon Carbon Corporation (Lot. No. 1048), analyzed by wet chemical methods, was found to contain 7.23% Cu, 2.92% Cr and 0.051% Ag. The gas-life testing (for AC, CK and PS) was performed using 170 ml of charcoal contained in a Canadian C2 cannister body.

The physical properties in gas-life date (single measurement) for TEDA loaded BPL charcoals are summarized in Table 1.

TABLE 1

| Loading Level (% w/w) | Density (g/ml) | % Water pick-up (% w/w) | CK Gas Life (min) | AC Gas Life (min) | PS Gas Life (min) |
|---|---|---|---|---|---|
| 0 | 0.47 | 33.9 | 0 | 0 | 54 |
| 3.31 | 0.49 | 37.0 | 9 | 0 | 69 |
| 6.34 | 0.50 | 36.1 | 11 | 6 | 51 |
| 6.42 | 0.49 | 33.7 | 12 | 6 | 48 |
| 9.05 | 0.52 | 29.5 | 15 | 6 | 59 |
| 12.05 | 0.52 | 27.6 | 19 | 8 | 33 |

Note:
the loading level = weight of TEDA used/weight of dry charcoal.
The density is measured using ASTM D 2854-70.
The percentage water pick-up = weight of water pick-up/weight of the dry charcoal used.

Note: the loading level = weight of TEDA used/weight of dry charcoal. The density is measured using ASTM D 2854-70. The percentage water pick-up = weight of water pick-up/weight of the dry charcoal used.

Figure 1:
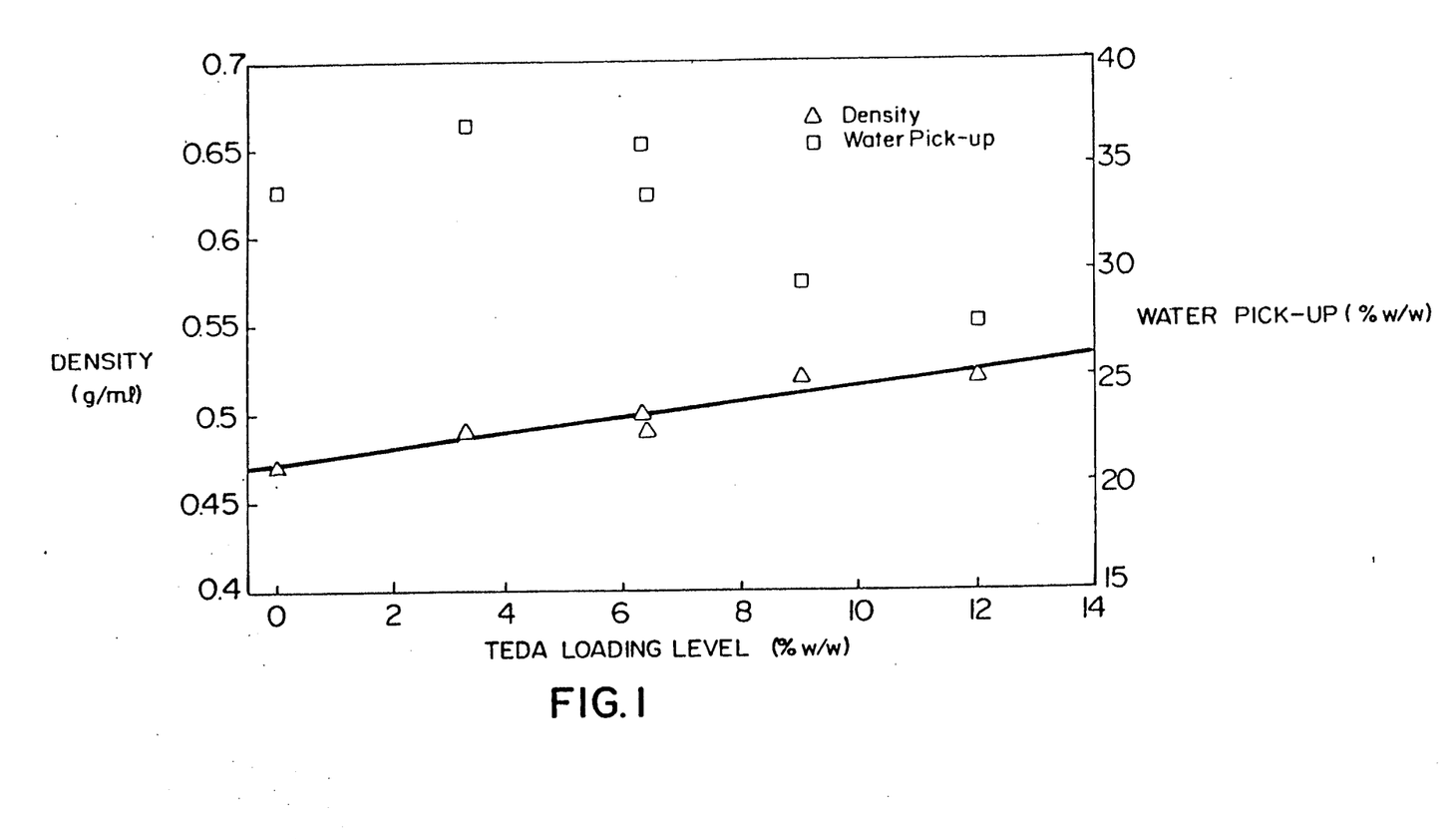

As expected, as the amine loading increased, the density of the resulting charcoal increased while the percentage of water pick-up decreased. These relationships are almost linear, as shown in FIG. 1, in which the density and percentage of water pick-up are plotted against the loading level of TEDA. However, it is not apparent why the BPL charcoal without impregnants, i.e. 0% TEDA, has a lower percentage of water uptake than a 3–6% TEDA-loaded charcoal.

Figure 2:
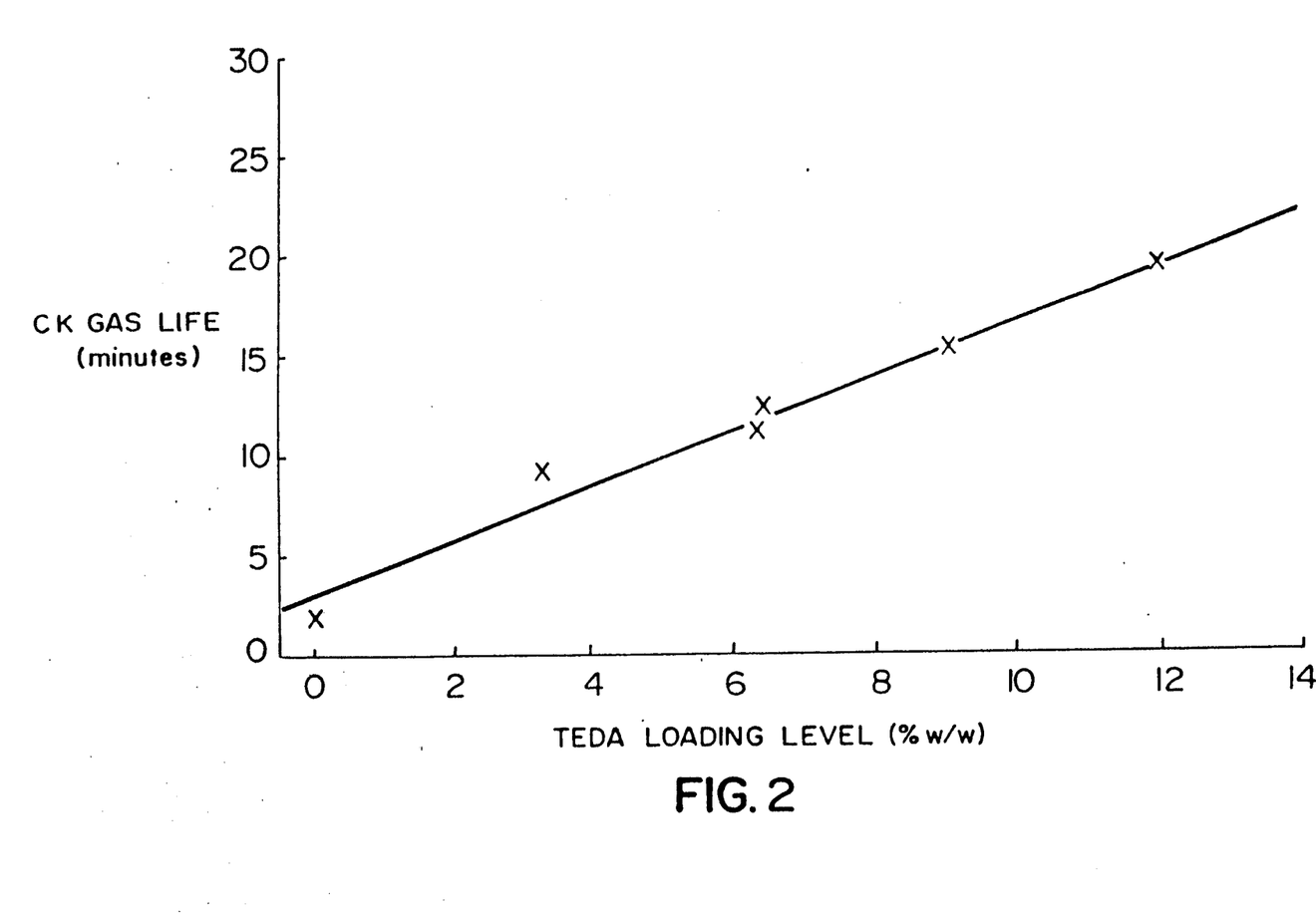

It will be noted from Table 1 that the CK gas life increases with the loading level of TEDA and, as shown in FIG. 2, the relationship is almost linear with a slope of 1.35 min. The last data point on the graph in FIG. 2 is at a TEDA loading level of 12.05% which still indicates an increasing trend for the CK-life versus the increasing TEDA loading level.

The area occupied by each adsorbed TEDA molecule could be evaluated from the density of the liquified adsorbate, and assuming a two-dimensional close packing on the surface according to the equation:

$$\text{Area per adsorbate molecule} = 4 (0.866) \frac{[M^{\frac{1}{3}}]}{\sqrt[3]{2 \, Ad}} \quad (15)$$

wherein M is the molecular weight of the gas, A is Avogadro's number and d is the density of the liquified adsorbate. Assuming that the BPL charcoal has a surface area of 1000 m²/g, then a loading level of 4% TEDA would correspond to an 8% coverage of the total surface area. A 12% TEDA loading level would mean that 24% of the total charcoal surface is covered with TEDA. Since about 90% of the total surface area of charcoal arises from micropores, this means that there is a significant penetration of TEDA molecules into the micropore structures.

Normal whetlerization of the charcoal will lead to a decrease of internal pore area by about 22%, which is approximately equivalent to the present situation at a 12% loading level of TEDA. However, the CK gas-lives for both cases differ. Freshly prepared ASC-whetlerites have CK gas-lives in excess of thirty minutes, but the present impregnation only at 12% TEDA yields charcoal with a CK gas-life of about 20 minutes.

The AC and PS gas-life data are shown in the last two columns of Table 1. While there is an increase in CK gas-life as the TEDA loading level increases, the AC gas-life data seem to indicate a levelling off at 6 to 8 minutes. It has been shown that BPL charcoal impregnated with ammonia alone removes hydrogen cyanide by a simple acid-base reaction mechanism occuring on the aqueous film on the charcoal surface. From the present observation, TEDA probably removes hydrogen cyanide in a similar manner by increasing the pH on the charcoal surface, instead of by other more complicated reaction mechanism. For chloropicrin (PS) the data seemed to indicate almost a constant breakthrough time at all TEDA loading levels. However, due to flucuation in the obtained data, no reliable conclusion can be drawn. An almost constant PS gas-life with respect to increasing TEDA loading level is expected because the removal of PS depends only on the available surface active sites on charcoal and not on the impregnants. Consequently, as long as the loading level of TEDA is not too high to impede adsorption of PS (12% TEDA—loading level in the present case is about 24% of the total surface area), the dynamic adsorption capacity, or the breakthrough time for PS should remain constant, due to the inherent large adsorption capacity of charcoal.

The physical and chemical properties of ASC-whetlerites impregnated with TEDA under reduced pressure are listed in Table 2.

Figure 4:
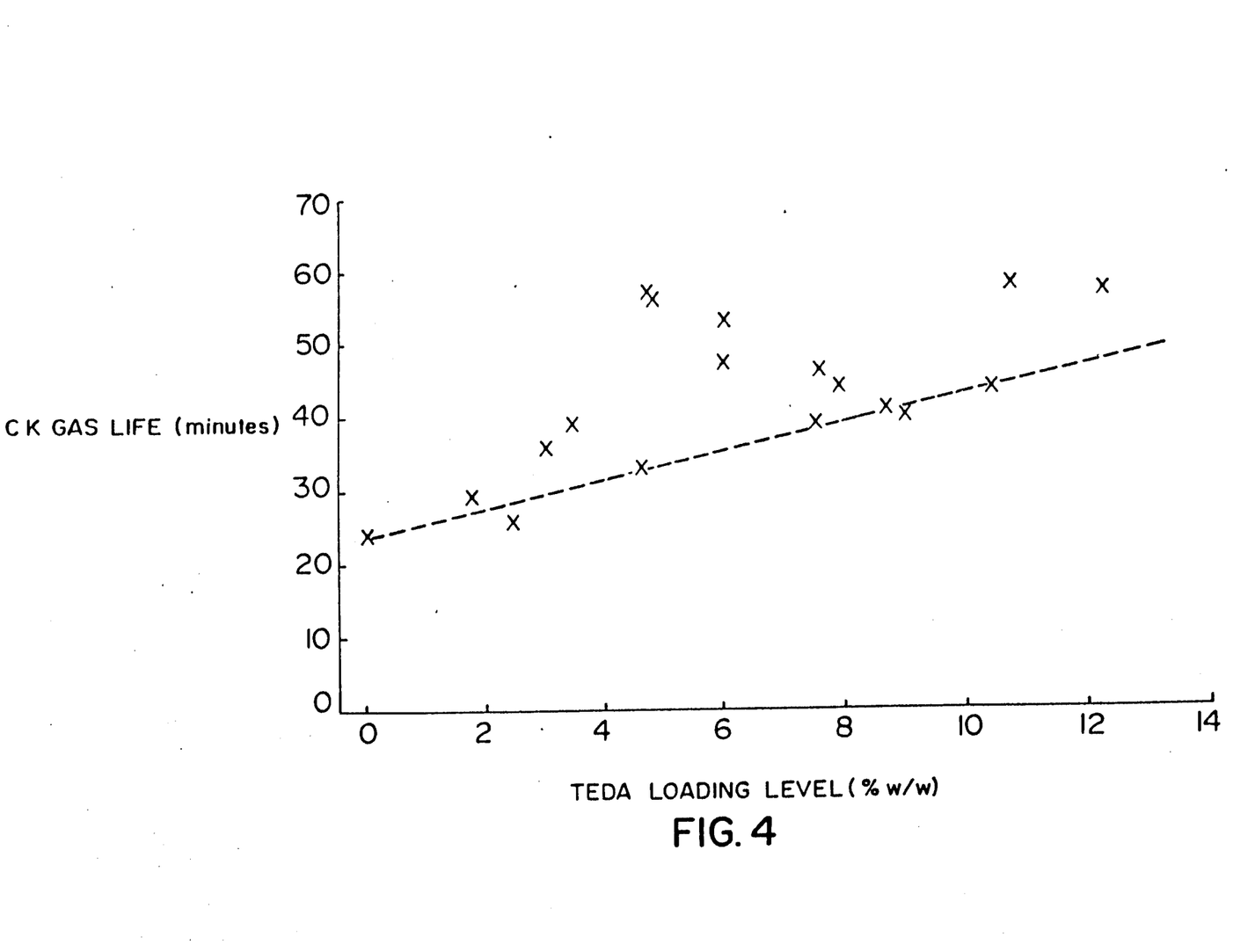

Column five in Table 2 shows the CK gas-life data for TEDA impregnated ASC whetlerites at various TEDA loading levels. This relationship is plotted on FIG. 4. The data points seem to be quite scattered. If the effect of the impregnation with TEDA is additive, then the increase in CK gas-life should be linear as shown by the dotted line on FIG. 4. The dotted line is obtained by interpolation using the slope of 1.35 minutes obtained from FIG. 2 for the BPL charcoal. This extrapolation is based on two assumptions.

(a) The addition of TEDA to charcoal enhances the dynamic adsorption capacity of charcoal for CK only;
(b) The added TEDA does not interact (react or complex) with the other inorganic impregnants, i.e. copper, chromium and silver, etc. on the charcoal surface.

To complete the assessment of the new impregnated charcoal, hydrogen cyanide (AC) and chloropicrin (PS) tests were performed. The results of the AC and PS

TABLE 2

| Loading Level (w/w) | Density (g/ml) | % Water Pick-Up (% w/w) | [NH$_3$] Content mg/l per 100 ml Charcoal | Gas-Life Data CK (min) | AC (min) | PS (min) |
|---|---|---|---|---|---|---|
| 0 | 0.59 | 28.9 (1.0) | 0.0013 (0.0002) | 24 (8); 34 | 49 | 35 |
| 1.57 | 0.60 | ·28.3 (1.1) | | 32 | 42 | 25 |
| 1.77 | 0.60 | 28.4 | 0.0012 | 29 (1) | | |
| 2.44 | 0.60 | 26.4 | | 26 | | 16 |
| 3.05 | 0.62 | 25.2 | | 36 (2) | 45 | 22 |
| 3.11 | 0.62 | 25.3 (1.3) | | 33 | 41; 51 | 31; 28 |
| 3.47 | 0.61 | 26.8 (0.2) | 0.0010 | 39 (13) | | 23 |
| 4.62 | 0.62 | 24.4 (0.2) | | 33 (10) | | |
| 4.71 | 0.62 | 25.0 (1.2) | 0.0010 | 57 (12) | | |
| 4.81 | 0.62 | 25.1 (0.5) | | 56 (14); 59 | 45 | 22 |
| 5.95 | 0.63 | 23.7 (0.3) | 0.0020 | 47 (17) | | 25 |
| 5.98 | 0.63 | 23.0 (0.5) | | 53 (11) | | 28 |
| 6.21 | 0.63 | 22.4 (0.7) | 0.0026 | 35 | 65 | 16 |
| 7.54 | 0.64 | 21.8 (1.9) | 0.0020 | 39 (5) | | 20 |
| 7.56 | 0.64 | 19.5 (4.5) | | 46 (13) | | |
| 7.58 | 0.65 | 20.2 (1.3) | | 52 | 30 | 18 |
| 7.90 | 0.64 | 21.8 (2.1) | | 44 (9) | | |
| 8.68· | 0.65 | 20.3 (1.8) | 0.0011 | 41 (15) | | |
| 8.97 | 0.65 | 19.8 (2.1) | | 40 (15) | | |
| 10.45 | 0.66 | 19.1 (0.3) | . | 44 (10) | | |
| 10.65 | 0.66 | 17.1 (0.6) | | 59 | 48 | 8 |
| 10.75 | 0.66 | 19.2 (1.6) | 0.0034 | 48 (17) | | |
| 12.57 | 0.67 | 16.6 (1.3) | 0.0032 | 62 | 61 | 17 |

In Table 2, the numbers in parenthesis indicate standard deviation, which involves at least three data.

Figure 3:
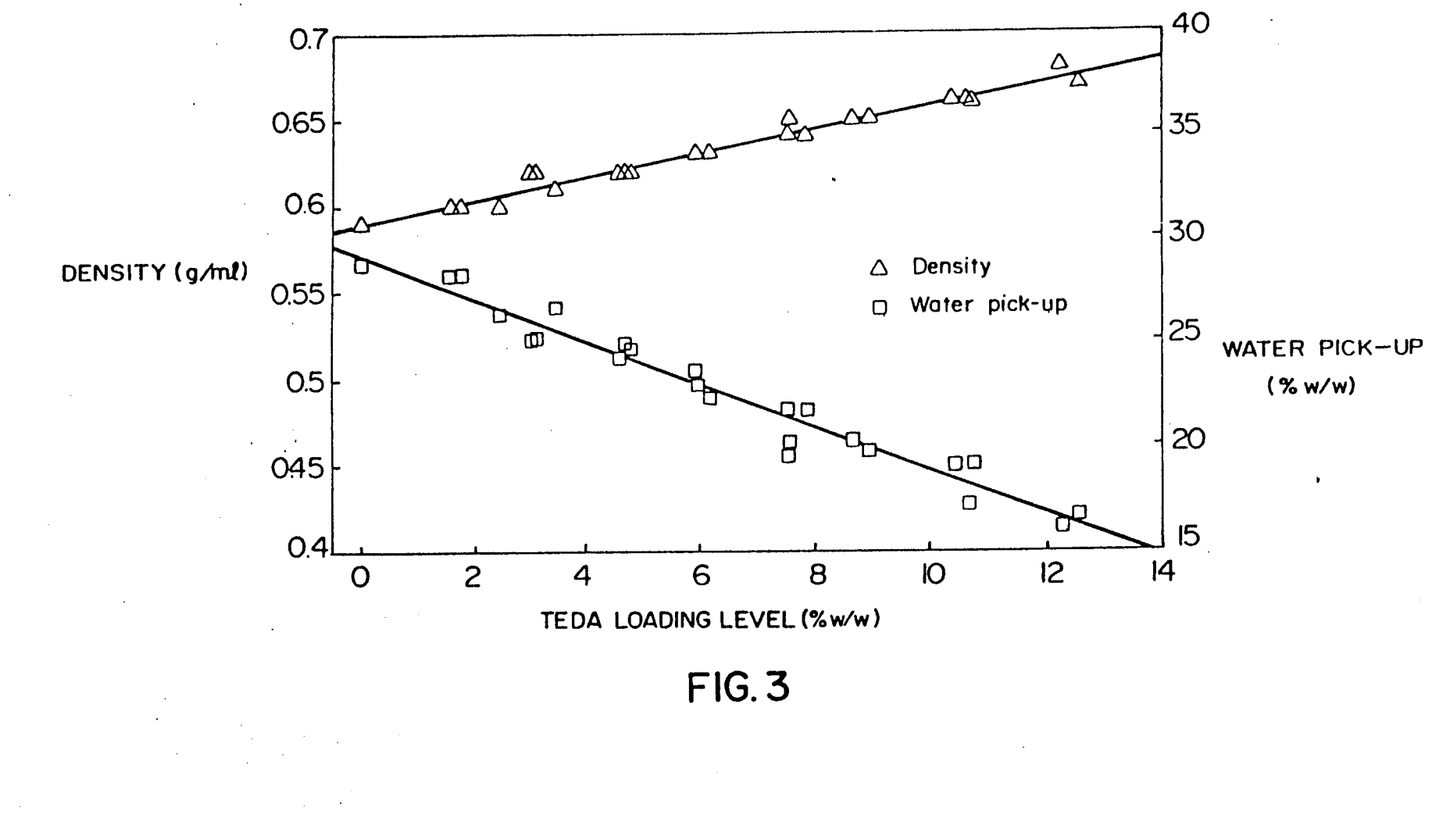
Figure 5:
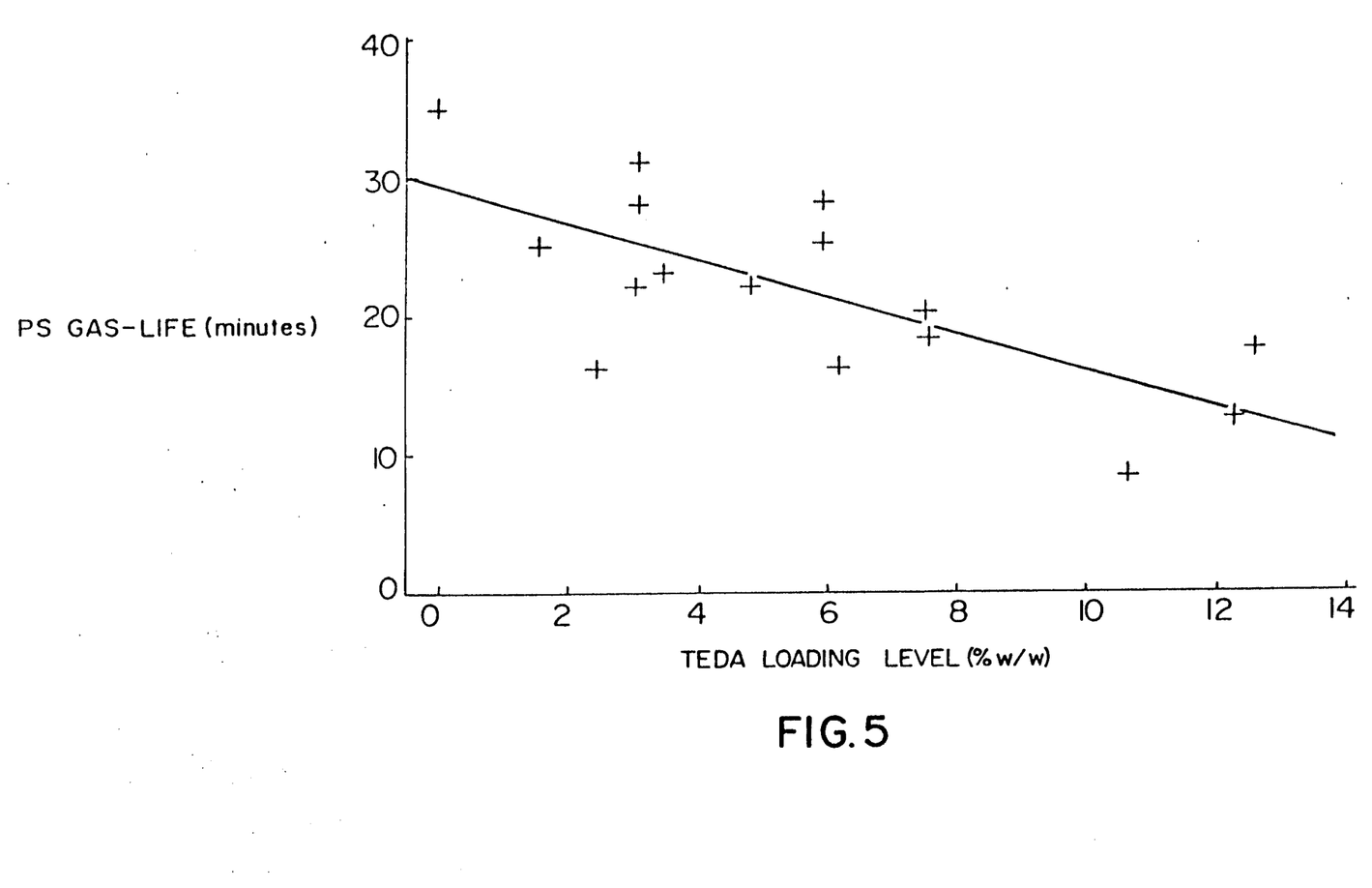

It will be noted that as the TEDA loading level increases the density of the resulting charcoal increases, while the percentage of water pick-up decreases. These effects are shown in FIG. 3. Linear trends can be observed for both the density and the percentage of water pick-up versus the TEDA loading levels despite a few scattered points. The slope for the density line is 0.007, which is close to the value 0.005 obtained for BPL charcoal (see FIG. 1). The slope for the line relating the percentage of water pick-up to the percentage of TEDA loading level for the ASC whetlerite is −1.1, which is the same as that for the BPL charcoal. These results can be summarized as follows:

(i) There exist linear relationships between the density and the percentage of water pick-up with the TEDA loading level on the ACS whetlerites.
(ii) The proximity of the values of the slope representing these two relationships for both BPL and ASC charcoals indicate that effects of the added TEDA is additive for water pick-up and densities of the product charcoals.

tests are listed in the last two columns of Table 2. The gas-life data of PS were also plotted against the TEDA loading levels as shown in FIG. 5. As expected, there was a gradual decrease in PS gas-life as the TEDA loading level increased, indicating loss of dynamic physisorptive capacity. However, the data were too scattered for any meaningful statistics to be performed. Thus, there has been disclosed a relatively simple method of loading TEDA onto charcoal. Moreover, the resulting product provides good protection against toxic gases. At the optimal loading of 4.7% TEDA, the charcoal has a 140% enhancement of CK gas-life and adequate protection against AC and PS.

The embodiments of the invention in which an exclusive property or privilege is claimed are defined as follows:

1. A process for impregnating activated carbon with triethylenediamine, said process comprising the steps of placing the triethylenediamine on dried activated carbon; subjecting the activated carbon and the triethylenediamine to a vacuum; and then heating the carbon and the triethylenediamine for an extended period of time while under vacuum.

2. A process according to claim 1, including the step of drying the carbon before placing the triethylenediamine thereon.

3. A process according to claim 1, wherein activated carbon is placed in a desiccator and dried; triethylenediamine is placed on the carbon; and the desiccator is evacuated and then heated at 40° C. until no triethylenediamine crystals are visible on the carbon.

4. A process according to claim 3, wherein the carbon is dried in the dessicator at 150° C. for three hours, the dessicator is evacuated to a pressure of 0.13 to 13 Pa, and the heating step is effected for at least three days.

5. A process according to claim 4, wherein the pressure in the dessicator is reduced to 1.3 Pa.

* * * * *